Nov. 10, 1942.                    W. E. WHALEY                    2,301,834
                                   MOBILE SIGN
                                Filed Nov. 1, 1940                2 Sheets-Sheet 2
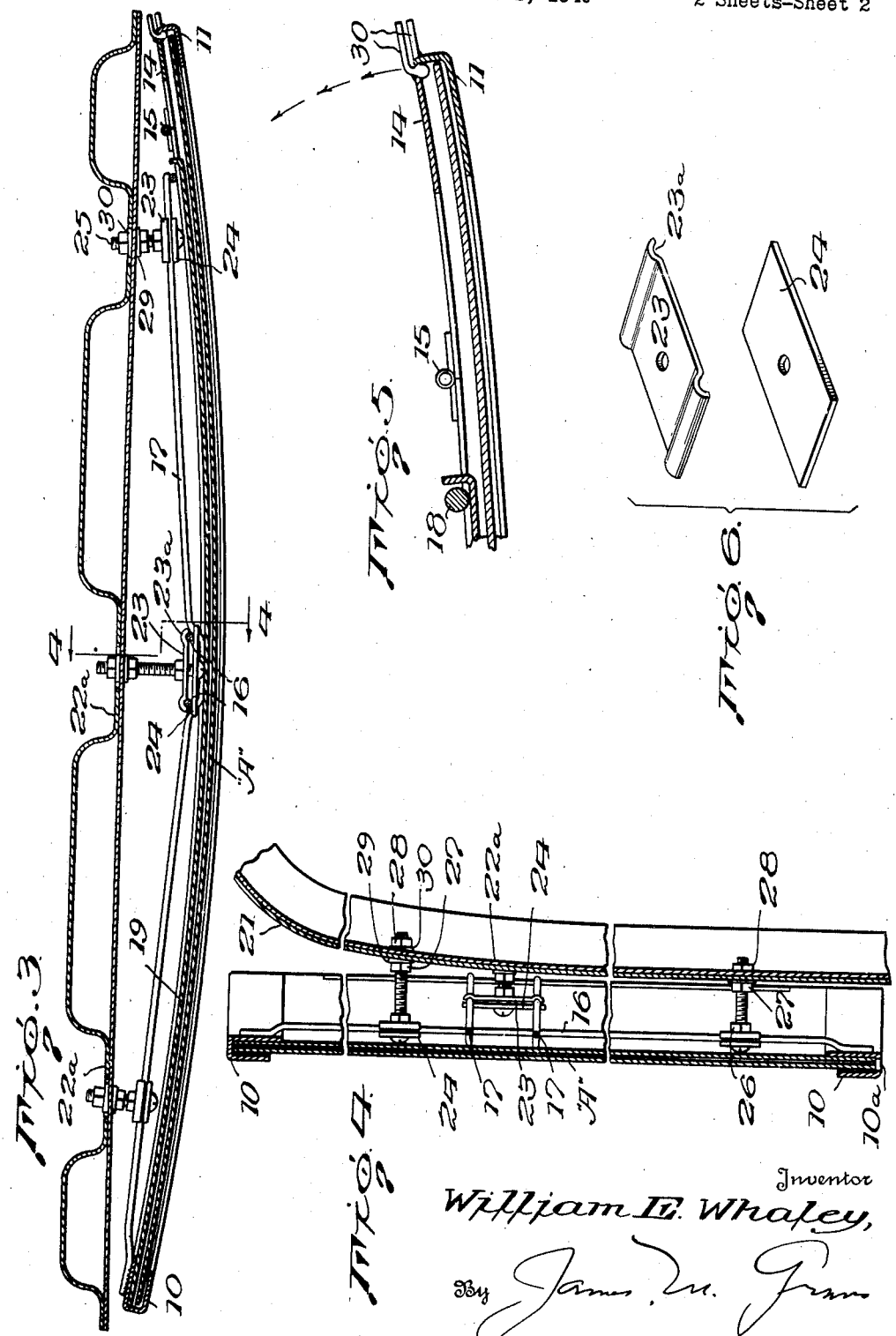
Inventor
William E. Whaley,
By James M. Gunn
Attorney Patented Nov. 10, 1942

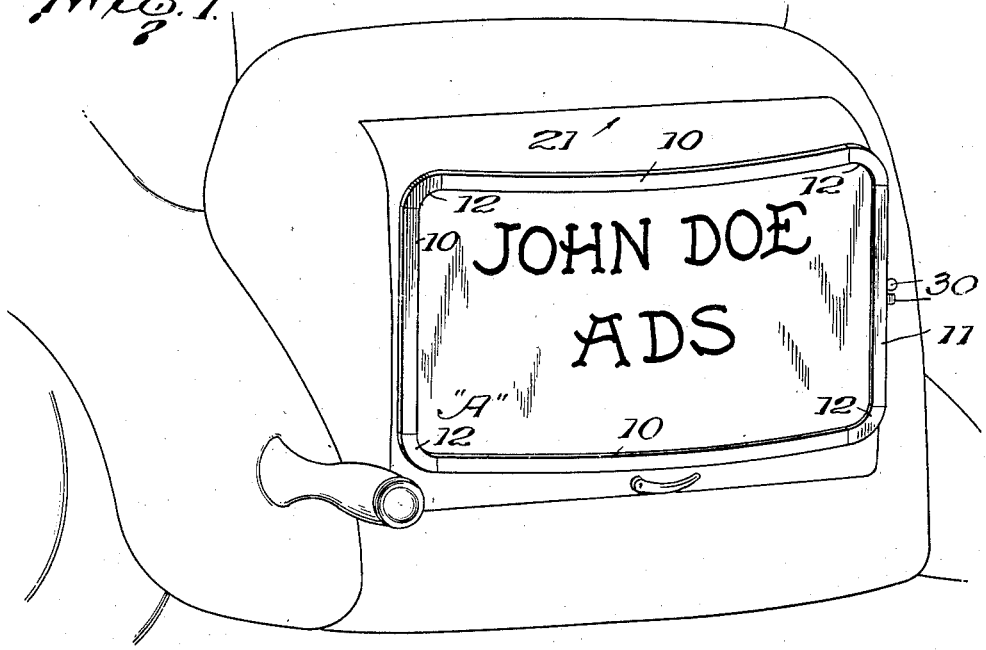
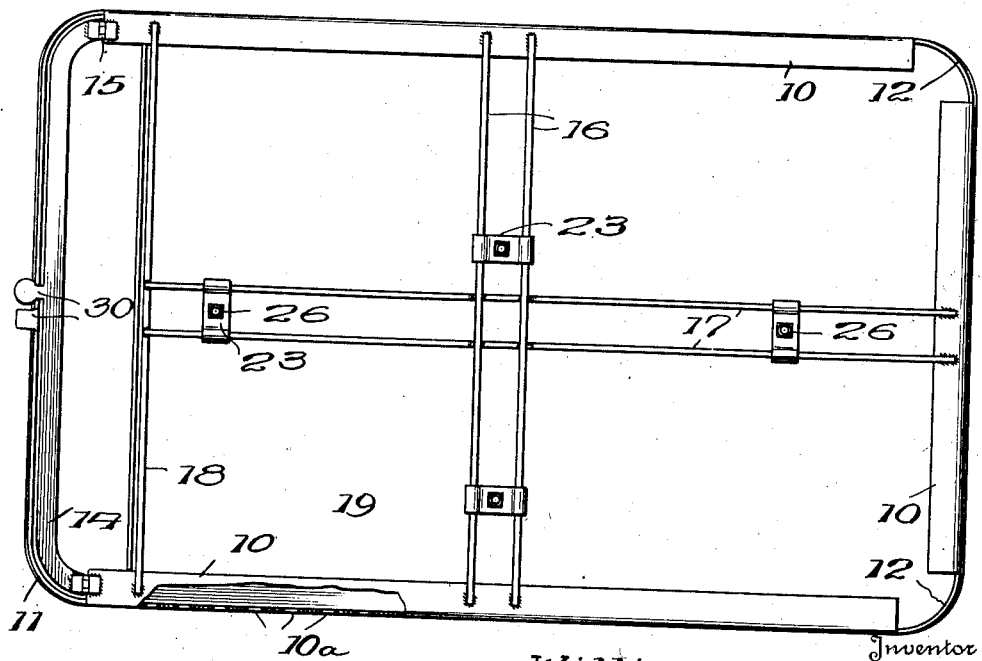

2,301,834

UNITED STATES PATENT OFFICE 2,301,834

MOBILE SIGN

William E. Whaley, Louisville, Ky.

Application November 1, 1940, Serial No. 363,926

5 Claims. (Cl. 40—129)

My invention relates to improvements in mobile signs, and has to do, more particularly, with the provision of a display-card holder adapted for direct attachment to a body panel of an automobile of the passenger type.

The sales-effectiveness of taxicab poster advertising has resulted in widespread adoption of this medium of advertising. For the most part, the posters heretofore in use upon taxicabs have been structurally incorporated with, or supported by, a member which serves as a cover for the spare tire of the vehicle. During the past two years, however, the mounting of spare tires upon the exterior of passenger vehicles has become obsolete and, accordingly, this instrumentality has become unavailable as a poster support.

Advertising posters of a type most suitable for taxicab use consist of a stiff paperboard card lithographed in a plurality of contrasting colors. While quite resistant to moisture by reason of their calendered and lithographed nature, such cards have limitations in respect to edge wetting and buckling stresses caused by variant air pressures induced by vehicle travel. Installation cost, reduction of vehicle body damage to a minimum, resistance to destruction by minor traffic accidents and road vibrations, lightness in weight, facile card replaceability, silence and freedom from rattles, adaptability to body panels of various sizes and curvatures, and adjustability to assure maximum visibility without card glare or shadow are factors which must be successfully dealt with to attain practicability in a device of this general nature.

The present invention, as embodied in the structural form hereinafter disclosed, has, as its desideratum, the solution of the foregoing problems in mobile signs of this general type and is characterised by the attainment of certain well-defined objects. It is a primary object of my invention to provide a poster-card holder of the class described which, made in a single standard size and form, is inherently adaptable for securement to, and support upon, any of a vast number of sizes and shapes of conventional automobile bodies of the passenger type.

It is also a salient object of my invention to provide a poster-card holder for taxicab use which, though light in weight, is durable even under the severe conditions of road vibration and abuse encountered in vehicles operated for hire.

It is an object of my invention, also, to provide a poster-card holder of the class set forth which is protective of the card, serving to shield the edges thereof from much if not all of the moisture incident to outdoor exposure, serving to baffle the variant air pressures induced by vehicle travel, and generally guarding the card against plucking and puncturing blows which frequently occur in closely moving city traffic.

It is an object of my invention to provide a poster-card holder of the class described which, though closely fitted to the supporting vehicle body panel, permits of facile card replacement.

It is an object of my invention to provide a poster-card holder of the class described which, though extremely simple in construction, affords a degree of adjustability with respect to the vertical, such that no glare or shadow is presented to the normal observer along the street traveled.

Further objects, and objects relating to details and economies of construction and installation will more definitely appear from the description to follow. In one instance, I accomplish the objects of my invention by the means and methods set forth in the following specification. My invention is clearly defined by the appended claims.

A structure constituting a preferred embodiment of my invention is illustrated in the accompanying drawings, in which:

Fig. 1 is a perspective view of the lower rear portion of an automobile the body of which is provided with a trunk section, upon the door of which trunk section is mounted a sign carrier constituting one preferred embodiment of my invention;

Fig. 2 is a rear elevational view of the sign carrier and its mounting means detached from the automobile body panel;

Fig. 3 is a horizontal sectional view of the same carrier and the body panel to which it is mounted, showing details of its mode of attachment;

Fig. 4 is a vertical sectional view of the sign carrier and body panel taken on the line 4—4 of Fig. 3;

Fig. 5 is a detail sectional view, on an enlarged scale, of the gate of the carrier and by reason of the hinged character of which the removal and replacement of posters is facilitated; and Fig. 6 is a disassembled perspective view of the stay-engaging plate members forming a part of the carrier-mounting means.

Throughout the several views, the same reference numerals refer to the same parts.

In a broad sense, the several concepts of my invention may be said to find embodiment in a poster-card holder for automotive vehicles which consists of an annular frame of generally rectangular form and channel cross-section adapted snugly to receive a narrow marginal portion of the paperboard display card, and provided with a breakout inboard section through the opening of which card replacement is possible. Stay means extend across the inboard face of the frame, increasing its inherent rigidity, and these stay means are associated with vertically and horizontally shiftable frame mounting elements adapted to extend through suitable apertures in the vehicle body. The mounting means, in addition to vertical and horizontal adjustability with respect to the stay means, also are widely adjustable in an inboard-outboard direction with respect to the plane of the card holder, whereby the frame may be employed upon body panels having various curvatures relative to the general plane of mounting for the frame, and whereby the frame and its supported card may be inclined, with respect to the vertical, to insure good visibility without the creation of glare or shadow effects in the card. While the snugness of assembly of card and frame prevents, to a large extent, access of precipitated moisture to the card edges, means are provided, in my frame construction, for protecting the bottom edge of the card against such moisture as may tend to accumulate in the frame. Preferably, also, air foil means are provided which protect the marginally held card against extractive effects of differential air pressures induced by travel of the vehicle at high speeds and in cross winds.

Referring to the construction illustrated in the accompanying drawings, my invention preferably, though not exclusively, finds structural embodiment in an oblong, slightly curved annular frame of channel cross-section constituted by a substantially rectangular one-piece annulus fabricated, for the most part, from "channel" stock. Where, as illustrated, the corners of the frame are rounded, the manufacture of this frame may be facilitated by welding up into the form shown, three "channel" sections 10 and one "angle" section 11 with four corner sections 12 of angle stock. A gate section 14 is provided complementary to the "angle" section 11 and the corner sections 12 adjacent thereto, and is assembled with the frame by means of hinges 15 and a snap latch 30 of the general type commonly employed on ladies' handbags and the like.

Means are provided for stiffening as well as mounting the thus-constituted, slightly-curved frame of channeled cross-section, which means consist of a parallelly spaced pair of stay-rods 16 vertically traversing the frame and welded thereto at their ends, and a similar pair of stay rods 17 horizontally traversing the frame and each welded thereto at one end and to a fifth rod 18 which is welded to and bridges the top and bottom sections 10 of the frame adjacent the hinges 15. As is clearly shown, the frame member is formed with a slight transverse curvature and is braced by the crossed rods 16, 17 and 18 which are welded to the inboard flanges of the frame. By stressing the frame to a curvature of less than normal radius during the assembly of the rods 16 and 17 therewith, a slight degree of tension is provided therein and a rigid structure results. The welding of the several rods 16 and 17 to each other at their points of crossing also contributes materially to the strengthening of the construction. Within the limits defined by the frame portions 10 and the rod 18, and suitably secured to the concealed surfaces thereof, is an air-foil member 19 the purpose of which will be explained later during the discussion of the operation and utility of my device. This air-foil member 19 is formed from light-gauge sheet metal peripherally attached, as by welding, to the member 18 and the inboard flanges of the member 10.

Bodies of modern passenger automobiles vary widely in size and configuration, and the panels which comprise these bodies are generally curved in several directions and are suitably reinforced by truss sections of pressed sheet metal suitably embossed and skeletonized to afford maximum panel strength with minimum weight. Particularly is this so in the case of automobiles having an inbuilt trunk provided, as here illustrated, with a rear panel 21 which is hinged to the body and constitutes the trunk door. As best shown in Figs. 3 and 4, the disclosed panel 21 is conventionally reinforced by a pressed metal member 22 having embossed portions 22a which contact the panel 21 at spaced points along its inner surface and lend requisite rigidity thereto. My postercard carrier is especially well suited for mounting upon reinforced body panels of this general type, and is inherently adaptable to a wide range of structure, shape and size therein, as will appear.

In accordance with one of the salient concepts of my invention mounting means are provided which are characterized by what might be described as "universal" adjustability, namely, horizontally, vertically, and panelward. Specifically, my preferred mounting means comprise, as illustrated, four mutually independent T-shaped brackets each of which is constituted by an outboard clamping plate 23 having channels 23a adapted to receive the parallelly-spaced rods 16 or 17 with which it is assembled, an inboard clamping plate 24 adapted to overlie the rods 16 or 17 with which the respectively coactive plate 23 is associated, a headed, threaded stem member 25 upon which a member 23 and a member 24 are strung, and a threaded nut 26 by which the said members 23 and 24 may be forced into clamping engagement upon the rods 16 or 17 with which the pair of plates are associated. As will be appreciated from an inspection of Fig. 2, there is thus obtained a wide range of lateral adjustability for the four T-shaped brackets such that the stems 25 thereof may be suitably located with respect to the margins of the poster frame and the panel-contacting portions 22a of the reinforcing member.

Actual attachment of the T-shaped brackets to the panel 21 is effected by clamping nuts 28 and 27, threaded upon the stems 25, within and without the reinforced panel and suitably spaced therefrom by washers 30 and 29 strung upon the stems 25. Glare and shadow are two factors which must be given consideration in any outdoor display device of this type, and these members 27 and 28, taken with the transversely curved character of the frame afford a simple solution for the problem of proper illumination in that, through the adjustability of the members 27 and 28, the frame with the complementarily-curved card A disposed therein may be inclined any desired angle with respect to the vertical. This individual inboard-outboard adjustability of the several sets of members 25, 27 and 28 with respect to the plane of frame is also of importance in the applicability of the device to a body panel of complex curvature. This feature will be more definitely set forth later in this specification, as will be the advantages inherent to the lateral adjustability of the disclosed brackets.

Poster cards of the type intended for use in my frame are—by dictate of commercial expediency—of inexpensive paperboard construction. While the faces of such cards are quite weather-resistant due to the calendered character thereof and—in the case of the front face—to the lithographing thereon, the marginal edges thereof are relatively moisture-absorbent and cannot be readily and cheaply waterproofed by impregnation with a sealing compound. I have found that such a card, snugly marginally received in a frame of channel cross-section, is adequately protected thereby along its top and side edges but suffers injury along its bottom edge by reason of ingress of water which tends to accumulate in the lower portion of the frame. I have avoided this problem, in the disclosed frame construction, by drainage of the channel through a multiplicity of drainage slots 10a formed in the bight portion of the lower channel section.

The mode of application and the novel function features of the above-described construction should be readily apparent. Assuming, as illustrated, that the device is to be installed upon a reinforced body panel of the type shown generally in Fig. 3, the optimum locations for the panel perforations are first determined. Where, as is common, the panel has been provided with several perforations at the body factory, which perforations are intended to receive the tail-light bracket bolts or bolts for securing an ornamental trim member, these holes may be utilized for receiving some of the fastening means of my device, thereby reducing the amount of labor required for its installation, as well as lessening the disfigurement of the body panel incident to providing a large number of perforations therein. By reason of the "universal" lateral adjustability of the four fastening members upon the respective rods 16, 17, such utilization of existing panel perforations is assured, and the disposition of the additional required perforations in the panel-contacting portions 22a of the truss member is rendered possible, regardless of the position of such panel-contacting reinforcing portions.

While, commonly, the rear panel of present day automotive vehicles is inclined to effect better streamlining, such panels are, generally, curved in several directions and the symmetrical disposition of an almost "plane" sign thereon would be commercially impractical but for the use of individually adjustable fastening means of the type described in this specification. My fastening members include stem portions 25 which are of sufficient length to reach through the provided perforations in the panel, even though the curvatures mentioned are considerable, and the actual anchorage of the stems 25 upon the panel is effected by suitable adjustment of the members 27 and 28 threadedly associated with each individual stem. Not only does this construction accommodate itself to varying degrees of panel curvature, but, what is equally important, an inclination of the frame and its received card is permitted relative to the mean plane of the panel. As is well known, outdoor signs which are slightly inclined with respect to the vertical have the advantage of being free from shadow and glare under natural illumination, and my construction by reason of its curvature and inclinability, may be properly disposed with respect to the source of illumination, regardless of the over-inclination or under-inclination inherent to the body panel upon which it is mounted.

The drainage feature of the present invention, by reason of which the lower edge of the card A is protected from the effect of moisture gaining access to the interior of the frame channel, has been discussed. Even where the sign is substantially inclined with respect to the vertical, such moisture as accumulates in the lower channel section of the frame gravitates readily, and is drained through the slots.

The mode of installation of the card A within the frame is extremely simple. The frame proper is, by the fastening means shown, slightly spaced from the body panel, whereby the gate section 14 may, through manual disengagement of the latch 30, be swung upon its hinges 15 toward the body panel. The card A may then be inserted into the frame proper through the gate 14 by a simple lateral sliding action. After insertion of the card, the gate 14 is snapped closed and maintained upon the rear surface of the card by the latch 30.

While the channeled frame snugly engages a considerable marginal portion of the card A, it has been found that, at high speeds of travel and particularly where cross winds are encountered, the partial vacuum created upon the lithographed surface of the card, supplemented by a positive pressure upon the panel-facing surface of the card, may, in the case of a card of light weight, result in extraction of the card from the frame. To preclude such loss and destruction of poster cards without the necessity of placing the card under glass, my device preferably includes the airfoil member 19, which extends across the interior of the frame and is secured thereto, and to the cross rod 18. This airfoil member not only shields the unexposed face of the card A from the direct air currents, but also, in some measure, and, in accordance with aerodynamic principles, serves to produce negative pressure in the space between it and the unexposed surface of the card, which negative air pressure, in part at least, tends to balance the negative pressure developed upon the exposed card surface. Actual tests have demonstrated that, with the illustrated construction, inadvertent extraction of the card by air currents is precluded.

The illustrated frame construction, by virtue to cross-braced, tensioned design is sufficiently rigid to withstand minor accidents in traffic.

I am aware that my invention is susceptible of embodiment in various structural forms and that those skilled in the art, upon familiarization with the basic concepts herein disclosed, may, for purposes of structural simplicity or cheapening the cost of manufacture, find it expedient to make various structural changes therein. I, therefore, claim my invention broadly as indicated by the appended claims.

What I claim is:

1. A poster-card holder for automotive vehicles, comprising: a frame adapted to receive the marginal portion of a flexible display card and retentively support said card, a pair of closely spaced parallel rods traversing the rear face of said frame in both directions defining its general plane, and means for securing said frame upon vehicle body panels of widely differing extent and curvature, said last-mentioned means consisting of a plurality of similar brackets adjustably assembled with said bi-directionally-extending parallel rods for selectively spaced positioning with respect to the several sides of said frame and having body-panel-engaging portions individually adjustable on axes perpendicular to the general plane of said frame.

2. A poster-card holder for automotive vehicles, comprising: a relatively rigid frame adapted to receive the marginal portion of a flexible display card and retentively support said card, a pair of closely spaced resilient rods traversing the rear face of said frame in both directions defining its general plane, and means for securing said frame upon vehicle body panels of thin sheet metal having various extents and degrees of curvature, said last-mentioned means consisting of a plurality of similar brackets adjustably assembled with said bi-directionally-extending resilient closely spaced rods for selectively spaced positioning with respect to the several sides of said frame and having body-panel-engaging portions individually adjustable on axes perpendicular to the general plane of said frame.

3. A poster-card holder for automotive vehicles, comprising a relatively rigid, slightly-curved annular frame of channel cross-section adapted to receive the marginal portion of a complementarily curvilinearly-flexed display card, crossed stay members traversing the inboard surface of said frame and being under a slight tension tending to increase the degree of frame curvature recited, and means for securing said frame upon vehicle body panels of widely differing extent and curvature; said last-mentioned means consisting of a plurality of similar brackets adjustably assembled with said bi-directionally-extending stay members for selectively-spaced positioning with respect to the several sides of said frame and having body-panel-engaging portions individually adjustable on axes perpendicular to the mean plane of said frame.

4. A poster-card holder for automotive vehicles, comprising: a relatively rigid frame adapted to receive the marginal portion of a flexible display card and retentively support said card, a pair of closely spaced parallel rods extending across the rear face of said frame and attached thereto, a second pair of similarly spaced parallel rods extending transversely of said first rods, secured thereto and to said frame, and means for mounting said frame upon vehicle body panels of thin deformable sheet metal having various extents and degrees of curvature, said last-mentioned means consisting of a plurality of similar T-shaped brackets laterally shiftable to selected clamping positions on said parallel rods and including outstanding stem portions adapted for reception in apertures formed in the vehicle body panel and provided with body-panel-clamping means adjustable for facile engagement with and non-deforming support upon a body panel of varying curvature and spacing with respect to the plane of said frame.

5. A poster-card holder for automotive vehicles, comprising: a relatively rigid, generally rectangular frame constituted by upper and lower channel sections and side channel sections joining the respective ends of said upper and lower frame sections to constitute a channeled annulus receptive of the marginal portion of a flexible display card, means for effecting facile interchange of cards in said frame comprising an articulated frame section consisting of the inboard flange of one of said channel sections and partial portions of the inboard flanges of the two adjacent channel sections which latter are respectively hinged to the remaining frame proper along a common axis, means for securing said articulated frame section in contact with the adjacent marginal portion of the card, a pair of spaced parallel rods extending across the inboard portions of said frame in vertical and horizontal directions, and means associated with said parallel rods for mounting said frame and associated elements upon the exterior surface of a panel of the vehicle body.

WILLIAM E. WHALEY.